United States Patent
Gangil et al.

(10) Patent No.: US 10,432,466 B2
(45) Date of Patent: Oct. 1, 2019

(54) TRANSLATING PAAS/CAAS ABSTRACTIONS TO LOGICAL NETWORK TOPOLOGIES

(71) Applicant: Nicira, Inc., Palo Alto, CA (US)

(72) Inventors: Akash Gangil, Sunnyvale, CA (US); Jianjun Shen, Beijing (CN); Donghai Han, Beijing (CN); Salvatore Orlando, Naples (IT); Sai Chaitanya, Palo Alto, CA (US); Yves Fauser, Munich (DE); Gary Kotton, Raanana (IL)

(73) Assignee: Nicira, Inc., Palo Alto, CA (US)

( * ) Notice: Subject to any disclaimer, the term of this patent is extended or adjusted under 35 U.S.C. 154(b) by 4 days.

(21) Appl. No.: 15/630,672

(22) Filed: Jun. 22, 2017

(65) Prior Publication Data

US 2018/0375728 A1    Dec. 27, 2018

(51) Int. Cl.
*H04L 12/24* (2006.01)
*H04L 12/751* (2013.01)
*H04L 29/08* (2006.01)

(52) U.S. Cl.
CPC .......... *H04L 41/0853* (2013.01); *H04L 41/12* (2013.01); *H04L 45/02* (2013.01); *H04L 67/10* (2013.01); *H04L 67/16* (2013.01)

(58) Field of Classification Search
CPC ..... H04L 41/0853; H04L 41/12; H04L 45/02; H04L 67/10
See application file for complete search history.

(56) References Cited

U.S. PATENT DOCUMENTS

| | | | | |
|---|---|---|---|---|
| 2012/0120964 A1* | 5/2012 | Koponen | ........... | H04L 41/0816 370/409 |
| 2013/0326087 A1* | 12/2013 | Storz | ........... | G06F 9/541 709/246 |
| 2015/0263899 A1* | 9/2015 | Tubaltsev | ........... | H04L 45/02 370/254 |

OTHER PUBLICATIONS

Project Kuryr, "OpenStack Containers Networking ("Kuryr")", [Retrieved Jun. 22, 2017] Retrieved from the internet: <https://wiki.openstack.org/wiki/Kuryr>.
OpenShift SDN, OpenShift Enterprise 3.0, [Retrieved on Jun. 22, 2017] Retrieved from the Internet: <https://docs.openshift.com/enterprise/3.0/architecture/additional_concepts/sdn.html>.
SDN with Isolation for OpenShift, [Retrieved on Jun. 22, 2017] Retrieved from the Internet: <https://github.com/openshift/openshift-sdn/blob/master/ISOLATION.md>.

* cited by examiner

*Primary Examiner* — Mohammad S Anwar
(74) *Attorney, Agent, or Firm* — Patterson + Sheridan, LLP

(57) ABSTRACT

Certain embodiments of the present disclosure include a method for translating an application-level abstraction to a logical network topology. The method includes receiving an event request from a container orchestrator at an orchestrator adaptor. The method also includes translating the event request to a logical network resource via an application programming interface associated with a network virtualization platform. The method includes mapping the event request to the logical network resource. The method also includes deploying the logical network resource in a logical network via the network virtualization platform.

23 Claims, 6 Drawing Sheets

TRANSLATING PAAS/CAAS ABSTRACTIONS TO LOGICAL NETWORK TOPOLOGIES

PRIOR DISCLOSURE BY THE INVENTORS

Aspects of the invention described herein were disclosed at a VMworld 2016 Breakout Session entitled "NET9989—VMware NSX, Network Bridge to Multi-Cloud Future," on Aug. 29, 2016, in Las Vegas, Nev. Video of this session is available online at https://www.youtube.com/watch?v=3xHFK_8Ba58.

BACKGROUND

Software defined networking (SDN) comprises a plurality of hosts in communication over a physical network infrastructure, each host having one or more virtualized endpoints such as virtual machines (VMs) or containers that are connected to logical overlay networks that may span multiple hosts and are decoupled from the underlying physical network infrastructure. One common characteristic of software defined networking is a separation of the control plane from the data plane. Control planes in a network are concerned with determining the logical overlay network topology and maintaining information about network entities such as logical switches, logical routers, and virtualized endpoints, etc. The logical topology information is translated by the control plane into network configuration data, such as forwarding table entries to populate forwarding tables at virtual switches at each host. A virtual switch provided by a host may be thought of as a physical network switch implemented in software by the hypervisor, and may connect virtualized endpoints running on the same host to each other as well as to virtual endpoints on other hosts. A plurality of virtual switches distributed across a plurality of hosts may collectively, by way of their forwarding tables and with adjunct processes called tunnel endpoints (TEPs) implement a logical switch that can define a logical overlay network.

Platform as a service (PAAS) and container as a service (CAAS) solutions like Cloud Foundry, Kubernetes, and Openshift provide application level abstractions that allow developers to deploy, manage, and scale their applications. PAAS is a service that provides a platform that allows users to develop, run, and manage applications without the complexity of building and maintaining the infrastructure typically associated with launching an application. For example, a user can control software deployment with minimal configuration options, while the PAAS provides services to host the user's application. CAAS is a form of container-based virtualization in which container engines, orchestration, and the underlying compute resources are delivered to users as a service from a cloud provider. These solutions provide support for compute and storage but do not provide any native networking support. Instead, these solutions rely on network overlay solutions like Flannel or Calico to provide networking for the applications. Network overlay solutions use software virtualization to create additional layers of network abstraction that run on top of the physical network, while also providing new applications or security benefits. However, these network overlay approaches do not provide the flexibility of determining how the applications' networking needs are translated to underlying network topology. The topology may be useful for various reasons, including quota management, tenant-level isolation/multi-tenancy, and deployment flexibility.

SUMMARY

Herein described are one or more embodiments of a method for translating an application-level abstraction to a logical network topology. The method includes receiving an event request from a container orchestrator at an orchestrator adaptor. The method also includes translating the event request to a logical network resource via an application programming interface associated with a network virtualization platform. The method includes mapping the event request to the logical network resource. The method also includes deploying the logical network resource in a logical network via the network virtualization platform.

Also described herein are embodiments of a computer system, wherein a program executable in a processor performs operations to execute the method described above for translating an application-level abstraction to a logical network topology.

Also described herein are embodiments of a non-transitory computer-readable storage medium containing a program which, when executed by one or more processors, performs operations for translating an application-level abstraction to a logical network topology.

DETAILED DESCRIPTION

Figure 1:
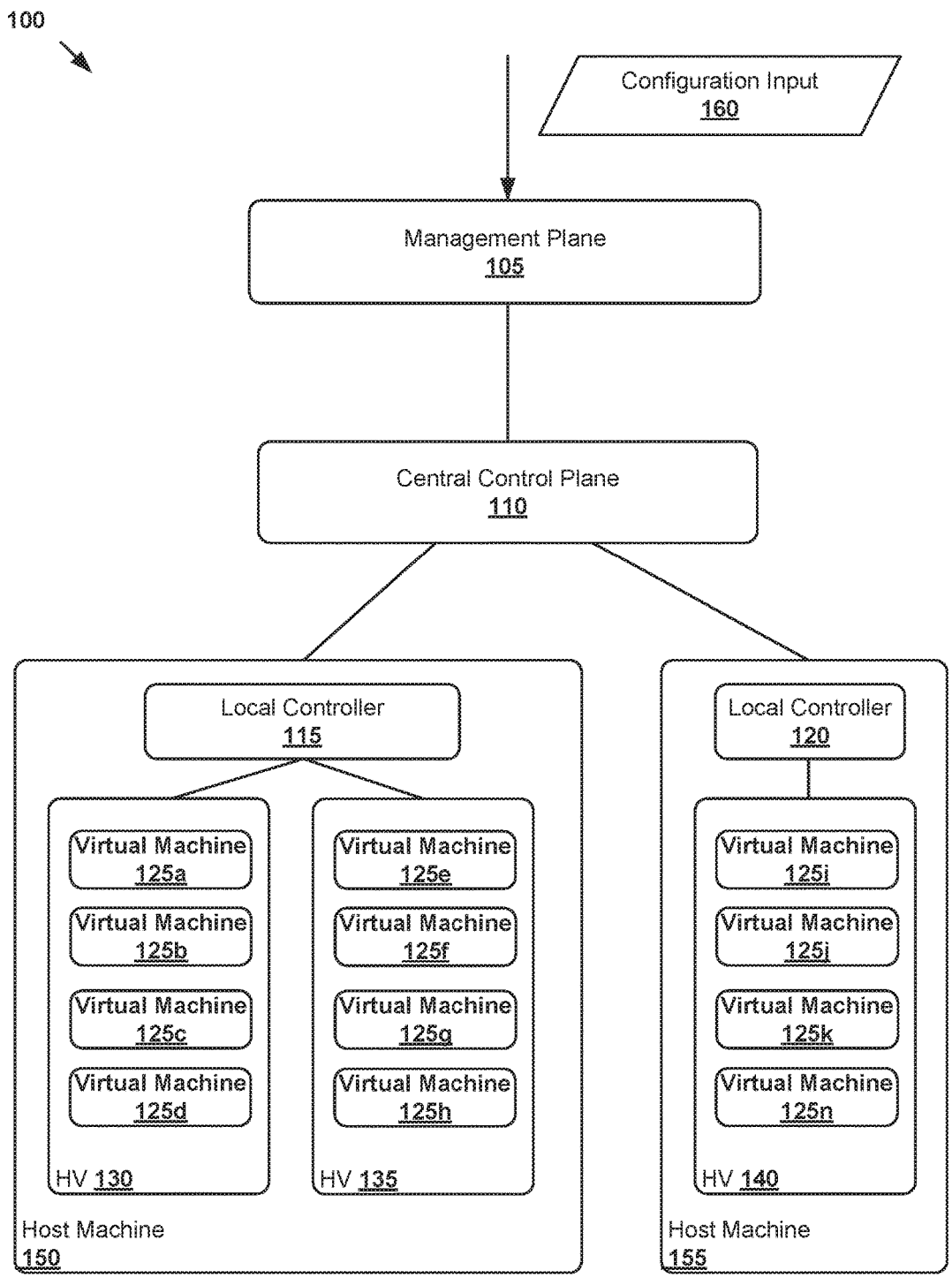
FIG. 1 is a block diagram of a network control system for a virtual network.

Embodiments presented herein provide a flexible solution to translate the configuration details of an application to logical network topologies that define the application networking on the network. That is, for an application such as a container, a user can deploy the container using a PAAS or CAAS platform (e.g., using an orchestrator as a tool to deploy the container). The user actions (such as deploying a container) and the configuration details of the application are referred to as event requests herein. The embodiments described herein identify concepts related to these event requests and then map those concepts to logical network elements. A central controller is used to translate the concepts to the underlying network topology using the logical network elements.

A plugin, referred to herein as the SDN container manager (CM), serves as a bridge between a PAAS/CAAS platform and a network virtualization solution such as SDN. The CM performs feature translation from the event requests to logical network topologies based on rules configured by a user. A central controller takes the logical network and implements it in the host machines, such as by defining forwarding rules, etc. that are implemented on the host machines. Accordingly, the container information, configuration details, etc., from the orchestrators is used by a management plane to define what the logical network should look like. The central controller then implements that logical network.

For example, a namespace or application created by a user using a PAAS platform is mapped by the CM to a logical switch with a Tier-1 logical router connected to a Tier-0 logical router. A logical router is a configured partition of one or more traditional network hardware routers. A logical router replicates the hardware's functionality, creating multiple routing domains within the router(s). SDN allows the creation of a two-tier logical router topology. Tier-0 routing interfaces with the physical network to exchange routing information with physical routers. Tier-0 routing also connects to multiple Tier-1 routing layers and receives routing information from those layers. The Tier-1 routing layer, in turn, interfaces with logical switches and provides routing between them. In some embodiments, multiple applications are mapped to the same logical switch and Tier-1 logical router if they share the same lifecycle and user set. Users can therefore use a single network fabric for all workloads, whether containers, bare metal, or virtual machines (VMs).

In other embodiments, different topologies besides a two-tiered topology can be utilized. A single tier of logical routers could be used in some embodiments. For example, all namespaces in a single container cluster can share the same logical router, while each namespace has its separate logical switch or switches connected to the router.

Certain embodiments described herein utilize containers deployed in virtual machines as an example. However, the techniques and architectures described herein can also support containers deployed on bare metal.

Topologies supported herein can be NAT (network address translation) or non-NAT topologies. Network address translation is the process where a network device assigns a public address to a device (or group of devices) inside a private network. In the NAT topology, a container manager configures the NAT rules on a logical router, so traffic from or to an external network or from or to a different namespace will be NATed.

FIG. 1 is a block diagram of a network control system 100 including a central control plane 110 that implements software defined networking in embodiments described herein. As shown, network control system 100 includes a management plane 105, a central control plane 110, and multiple local controllers (also called the local control plane (LCP)) 115 and 120 that operate on host machines 150-155, which are physical computing devices that support execution of virtual machines (VMs) or other virtualized computing instances, such as namespace containers. In addition, each of host machines 150-155 runs a hypervisor 130-140 capable of creating and managing a plurality of virtual machines 125a-125n on host machines 150-155. Each of virtual machines 125a-125n are examples of endpoints. Though virtual machines are shown as endpoints in FIG. 1, other types of endpoints, such as containers, are used in some embodiments. Embodiments described in further detail below use containers as example endpoints.

Hypervisors 130-140 and virtual machines 125a-125n, for example, are stored in a memory (not shown) of host machines 150-155. Hypervisors 130-140 abstract processor, memory, storage, and/or networking resources (not shown) of host machines 150-155 into multiple virtual machines (e.g., VMs 125a-125n) that can run side-by-side on the same host machines 150-155. That is, the virtualization software partitions physical host machines 150-155 into multiple secure and portable virtual machines. Each virtual machine may represent a complete virtual system—with virtual processors, virtual memory, virtual networking interface, virtual disk storage, and its own BIOS. Hypervisors 130-140 can also implement virtual routers, virtual switches, and the like.

In one embodiment, virtualization hypervisor can be installed directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server.

While not illustrated, each VM 125a-125n may include a software-based virtual network adapter that is logically connected to instantiations of the control plane (e.g., local controllers 115-120) running on host machines 150-155 that provides network access for the virtual machine. The virtual network adapter is typically connected to the local controllers 115-120 through a virtual switch that may serve as a physical network switch, i.e., serve as an edge device on the physical network, but implemented in software.

Though shown as single entities, it should be understood that both management plane 105 and central control plane 110 may be implemented as a distributed or clustered systems. That is, management plane 105 may include multiple computing devices that implement management plane functions, and a central control plane 110 may include multiple central controller computers or virtual machines or containers (or other logical compute instances) that implement central control plane functions. In some embodiments, one or more centralized controllers include both management plane and central control plane functions (e.g., as separate applications or functions).

In some embodiments, management plane 105 is responsible for receiving logical network configuration inputs 160 (e.g., through an application programming interface). As described in further detail below, logical network configuration inputs 160 may be received from a container orchestrator over a network. Users (e.g., network administrators) may further input logical network configuration data through, e.g., a command-line interface, a graphical user interface, etc. Each logical network configuration for each logical network, in some embodiments, may include data defining one or more endpoints (e.g., virtual machines 125a-125n or containers) and the connections between the endpoints.

Management plane 105 further generates desired state data that specifies how the logical network should be implemented in the physical infrastructure based on logical network configuration input 160. In some embodiments, this data includes description of the logical forwarding elements (e.g., logical switches, logical routers, etc.) and logical ports in a uniform format (e.g., as a set of database records or another format). The central control plane 110 then updates/implements the logical network based on the desired state information. For example, the central control plane 110 is responsible for managing and maintaining information about virtual machines, virtual switches, virtual routers, etc. implemented on host machines. In certain embodiments, central control plane 110 is responsible for ensuring that all endpoints in the logical network are able to send traffic at all times to all other endpoints that the network defines them as connected to, for example, using the techniques described herein.

In embodiments described herein, the management plane 105 translates an application level configuration (received from a container orchestrator) to logical network topologies that define the application networking on the SDN.

Figure 2:
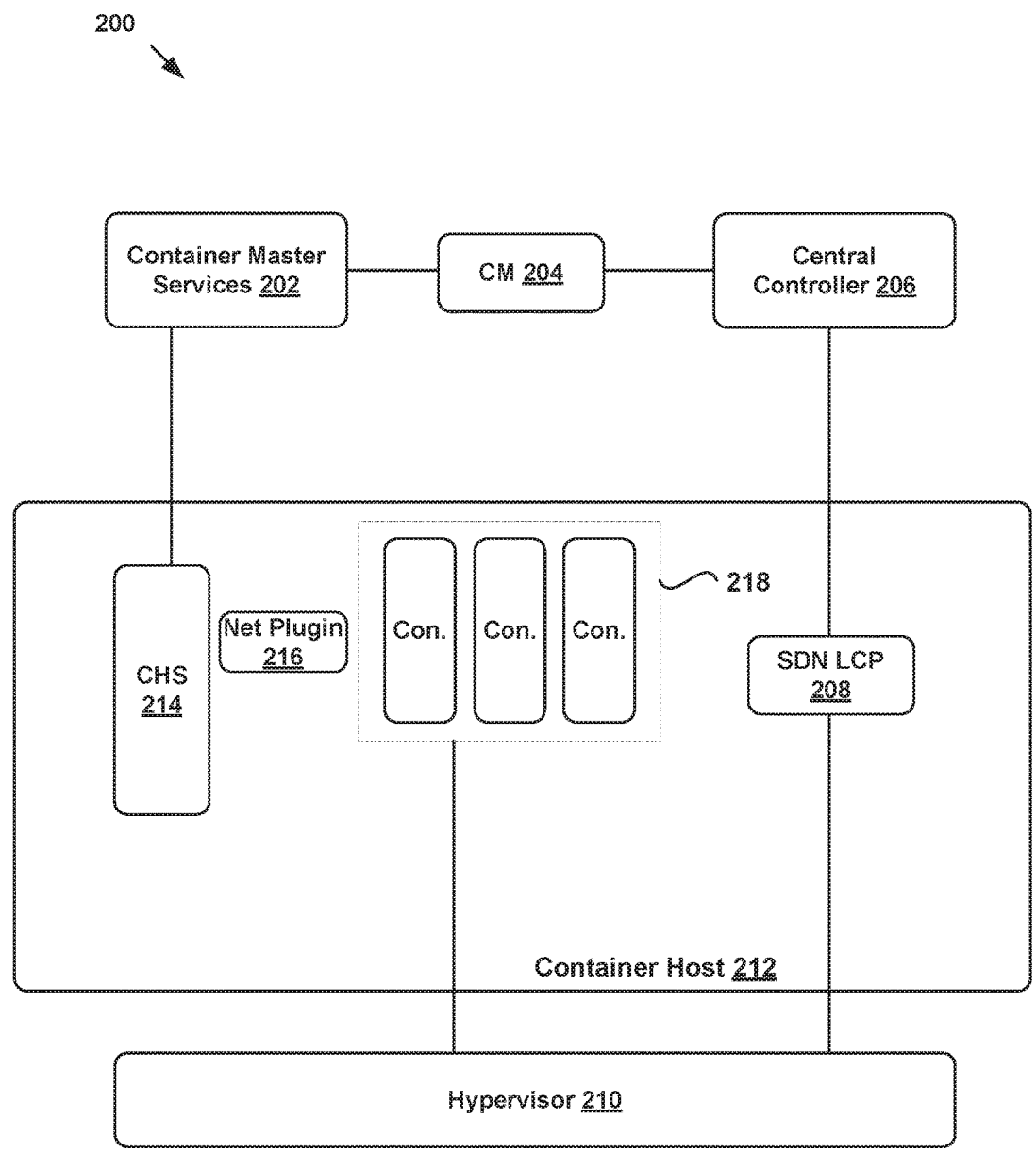
FIG. 2 is a block diagram of an architecture for implementing embodiments described herein.

FIG. 2 illustrates an architecture 200 for implementing embodiments described herein. Container orchestrators, or container orchestration tools, are used to manage containers across an infrastructure. That is, container orchestrators allow a user to deploy, scale, upgrade, remove, or otherwise manage containers. These tools simplify container management and provide a framework for defining initial container deployment plus the ability to manage multiple containers. Example container orchestrators include orchestrators from Kubernetes®, OpenShift®, Docker Swarm®, Cloud Foundry®, and Mesos®. Embodiments described herein utilize architecture 200 to take any container orchestrator and use plugins to leverage SDN virtualization for network connectivity and security. Management plane 105 comprises plugins or adaptors that communicate with any given container orchestrator over a network. Based on the information received from the container orchestrator (i.e., the event requests), management plane 105 creates a logical network topology to connect the container to a network and to provide requested services for the containers, such as security, multi-tenancy, traffic isolation, etc. Architecture 200 can therefore provide network topologies for any container orchestrator chosen by a user.

Architecture 200 includes a CM 204 coupled to container orchestrator-specific components. CM 204 may be part of the management plane 105 and run on one or more computing devices that implement the management plane 105. Accordingly, CM 204 may also be connected to container orchestrators over a network. CM 204 acts as a feature translator to translate the features or services that the user desires to an appropriate logical network topology that implements those features or services. When the user chooses an orchestrator, an adaptor for that specific orchestrator within CM 204 is loaded dynamically in this embodiment.

For example, in some container orchestrators, a user can create multiple objects, such as a namespace or a pod. A pod is a group of one or more containers. When a namespace is created, CM 204 is notified by the container orchestrator to make calls to create the logical network topology for the namespace. CM 204 can be notified in multiple ways. The container orchestrator can use push notifications to CM 204, or CM 204 can pull information (e.g., periodically) from the container orchestrator regarding which objects were created by the user. CM 204 can, for example, translate a namespace to a logical switch, a Tier 0 logical router, and a Tier 1 logical router, in an SDN. When CM 204 is notified that containers or applications were created, CM 204 creates a logical port for that container. The logical port may also be placed on a specific logical switch.

Embodiments described herein also provide options for different topologies. In addition, multi-tenancy may also be implemented in some embodiments. Multi-tenancy allows users to use a system and not be impacted by other users using the same system.

Architecture 200 also includes central controller 206. Central controller 206 may provide management plane and central control plane functions, such as described with respect to management plane 105 and central control plane 110, for a SDN. Accordingly, central controller 206 may be implemented on one or more computing devices that implement the management plane 105 and central control plane 110. Central controller 206 creates, snapshots, deletes, and restores software-based logical networks that are abstracted from the underlying physical hardware.

FIG. 2 further illustrates SDN LCP 208 in one example embodiment. The SDN LCP 208 is the SDN local control plane (illustrated as local controllers 115-120 in FIG. 1). The SDN LCP 208 is an agent executing on host 212 that implements the network configuration received from central controller 206 in the hypervisor 210. Host 212 may be a virtual machine in some embodiments. Host 212 further hosts one or more containers 218 managed by hypervisor 210 in this example. The net plugin 216 runs on a host 212 and manages the container network interfaces during a given container's lifecycle. For example, each container may have a container network interface, which may be a software-based virtual network adapter as described herein. The net plugin 216 can comprise an executable script in some embodiments. In other embodiments, SDN LCP 208 is an agent that executes outside of host 212.

If container host 212 is a bare metal server, the container network interfaces could directly connect to a physical server virtual switch and be handled similarly to virtual machine VNICs (virtualized network interface card) on a hypervisor. A central or local control plane programs the virtual switch to forward container traffic and implement all services and policies.

Architecture 200 further comprises container master services 202 and container host services 214. Container master services 202 is a component of the container orchestrator and performs central management functions for the container orchestrator. Container master services 202 can run on a server of the PAAS/CAAS. Container host services 214 is a host-level agent that communicates with container master services 202 and manages the lifecycle of the containers. Container host services 214 is an agent that runs on each host 212.

In operation, CM 204 is responsible for monitoring the container orchestrators (via container master services 202) and creating the network topology required via a central controller 206 API. CM 204 also utilizes the container orchestrator as a proxy to communicate SDN specific information to net plugin 216, such as the Internet Protocol (IP) address and Media Access Control (MAC) address of a container. Net plugin 216 uses this information to manage network interfaces for containers 218. CM 204 can monitor the container orchestrator via an event stream from the container orchestrator (e.g., from container master services 202), such as a websocket or an HTTP (Hypertext Transfer Protocol) persistent connection. The event stream is the flow of commands and requests from the container orchestrator. For example, the event stream contains the requests from a user for the addition or modification of resources, such as requests to create or destroy a container.

One example operation for net plugin 216 is as follows. First, a user directs a container orchestrator to create a container. A container master services 202 scheduler chooses a host 212 in the SDN network and communicates with container host services 214 to create the container. Container host services 214 then creates the container. Container host services 214 also directs net plugin 216 to set up networking for the newly created container. Container host services 214 passes arguments to net plugin 216 by setting up environment variables. These environment variables may include container ID, container network namespace, container name, and container network interface name.

Net plugin 216 also needs the container IP address and MAC address to assign to the container network interface. Net plugin 216 monitors container master services 202 to get the IP address and the MAC address. Net plugin 216 can also receive a VLAN (virtual local area network) ID to associate with the container. The addresses and VLAN ID are provided to container master services 202 by CM 204, which receives them from central controller 206.

Once net plugin 216 receives the needed information, it sets up the container network interface. Net plugin 216 programs the container with the correct VLAN ID. The container is then set up for connectivity.

Containers can also be deleted. To delete a container, net plugin 216 receives the container ID for the appropriate container to be deleted. For example, a user directs container orchestrator to delete a container. Container master services 202 determines the host 212 that includes the container based on the container ID, and sends the deletion information to the container host services 214 on the host 212. Container host services 214 directs net plugin 216 to delete the container. Then, net plugin 216 deletes the logical port associated with that container. Finally, the IP address/MAC address/VLAN deallocation is handled by CM 204.

Figure 3:
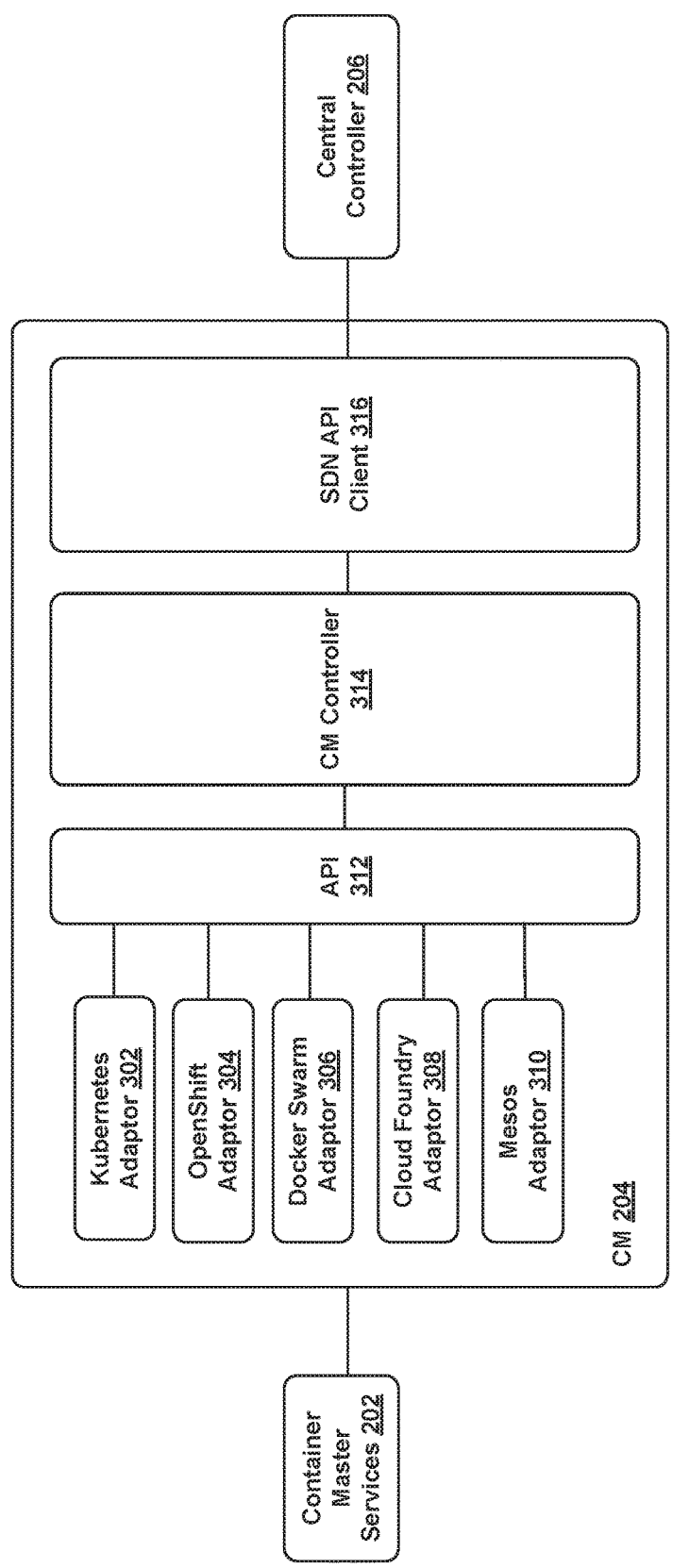
FIG. 3 illustrates a container manager in detail according to one example embodiment.

FIG. 3 illustrates CM 204 in greater detail according to one example embodiment. At a high level, CM 204 is comprised of three layers: container orchestrator adaptors, the CM controller, and an SDN API client.

CM 204 uses adaptors so that container orchestrators of different types can implement the interface exposed to interact with central controller 206. In this example, a number of adaptors are illustrated: Kubernetes® adaptor 302, OpenShift® adaptor 304, Docker Swarm® adaptor 306, Cloud Foundry® adaptor 308, and Mesos® adaptor 310. Adaptors for these orchestrators are merely listed as examples; CM 204 is highly dynamic and can utilize adaptors for any container orchestrators. These adaptors interact with the container orchestrator; i.e., container master services 202. The adaptors are exposed to a common API 312. The adaptors use API 312 to invoke the CM controller 314. CM controller 314 is a link between the containers and central controller 206. CM controller 314 can implement API 312 as high level constructs, such as "create project," "deploy container," "destroy container," "create network topologies for container," "configure external access for container," and the like. The generic API 312 is translated to a series of central controller 206 API calls using the SDN API client 316. In this example, SDN API client 316 is illustrated as a component of CM 204. In other embodiments, SDN API client 316 is separate from CM 204.

CM controller 314 is responsible for maintaining any state that it may need in form of a memory cache. To secure the communication channel between CM 204 and central controller 206, credentials may be stored in a file. To secure the communication channel between CM 204 and a container orchestrator, authentication protocols supported by the container orchestrator may be used, such as SSL/TLS (secure sockets layer/transport layer security) certificates.

CM controller 314 has the following responsibilities:
(1) Register the container orchestrator adaptors;
(2) Provide an SDN API to create SDN logical resources;
(3) Manage the cache to maintain container orchestrator to SDN mappings;
(4) Perform VLAN ID allocation; and
(5) Perform container interface (CIF) ID allocation.

During its initialization, CM controller 314 sets up "watchers" that monitor the container orchestration platform to detect the addition and/or modification of new resources. The watcher can either be a websocket or HTTP persistent connection, a method of polling the container orchestrator, or hooks provided by the container orchestrator. By using any of these options, CM controller 314 can react to any events in the container orchestrator.

In some embodiments, the event stream for the container orchestrator might need to be filtered for relevant events, depending on which container orchestrator is used. CM controller 314 can handle this filtering unless the container orchestrator API allows it.

An example implementation of CM 204 operates as follows. A container adaptor (i.e., adaptors 302-310) registers to CM controller 314 and sets up a continuous event stream. Based on the events received, features are translated from container orchestrator abstractions to SDN logical resources. The mappings are stored by the CM 204 cache. For example a pod in Kubernetes/OpenShift may be mapped as a logical switch port in SDN. Also, a namespace in Kubernetes/OpenShift may be mapped as a Tier-1 logical router, logical switch, and namespace group (NSGroup). Other abstractions like services and replication controllers are built on top of these two building blocks by central controller 206.

An example workflow is as follows. A user creates an OpenShift project or a Kubernetes namespace. The orchestrator adaptor 302 is notified of this creation event via the event stream. The adaptor 302 creates a logical switch and a Tier-1 logical router, and connects it to a Tier-0 logical router. The adaptor then attaches the logical switch to the Tier-1 logical router. The adaptor associates a default namespace group to the logical switch. The adaptor then adds this mapping to the CM 204 cache and informs the container orchestrator (Openshift or Kubernetes in this example) about this mapping.

The above steps set up the base networking for the project or namespace. When a user creates a pod, the adaptor sends a request to CM controller 314 to allocate a container interface (CIF) ID and a VLAN ID. The CIF ID is a unique identifier for the container interface. Once the CIF is created, the mapping is stored in the CM 204 cache and CM 204 informs the container orchestrator platform of the IP/MAC allocated for the CIF and the VLAN ID generated by CM 204. Net plugin 216 uses this information to configure the pod's networking interface.

Figure 4A:
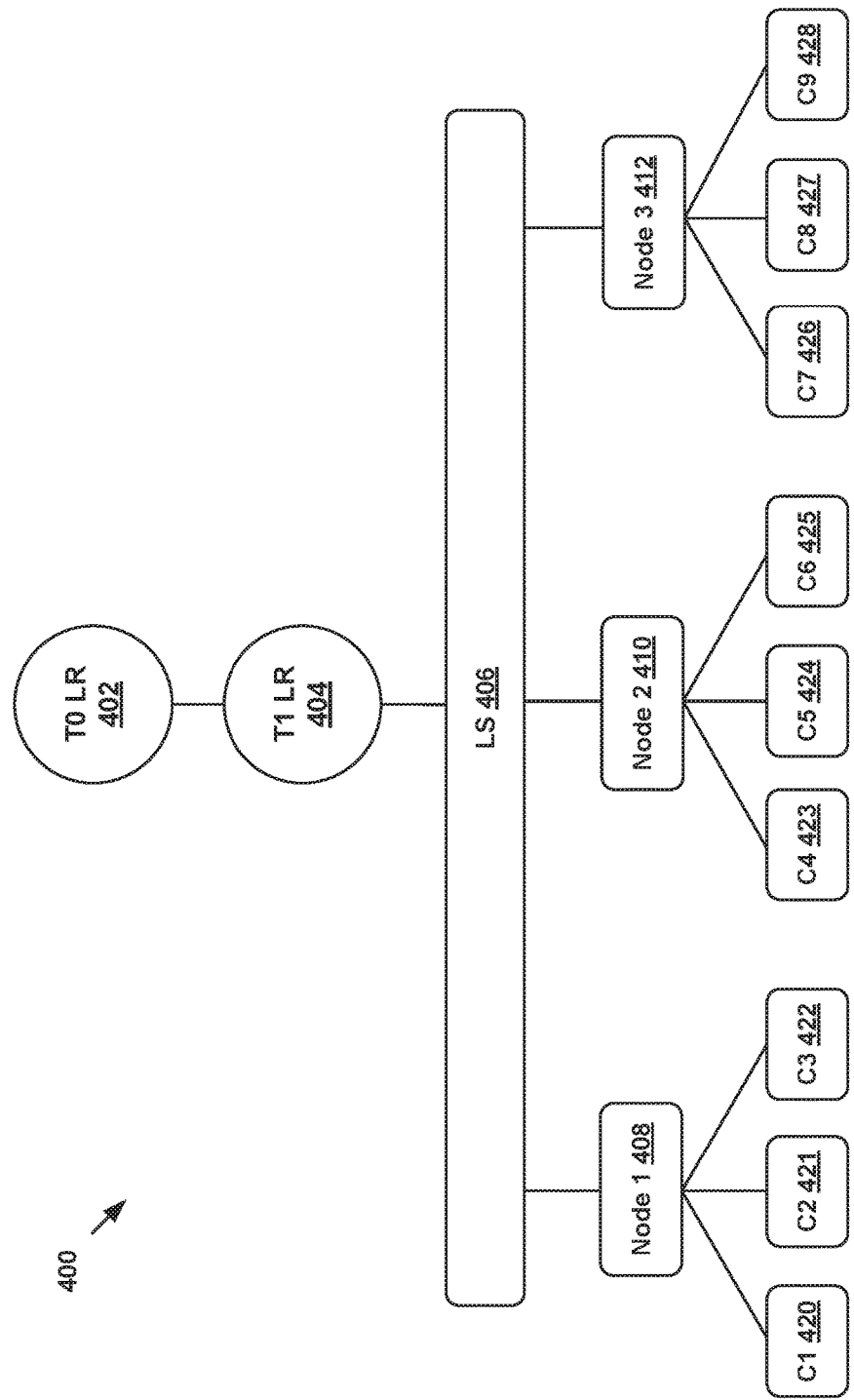
FIGS. 4A and 4B illustrate example topologies according to embodiments described herein.
Figure 4B:
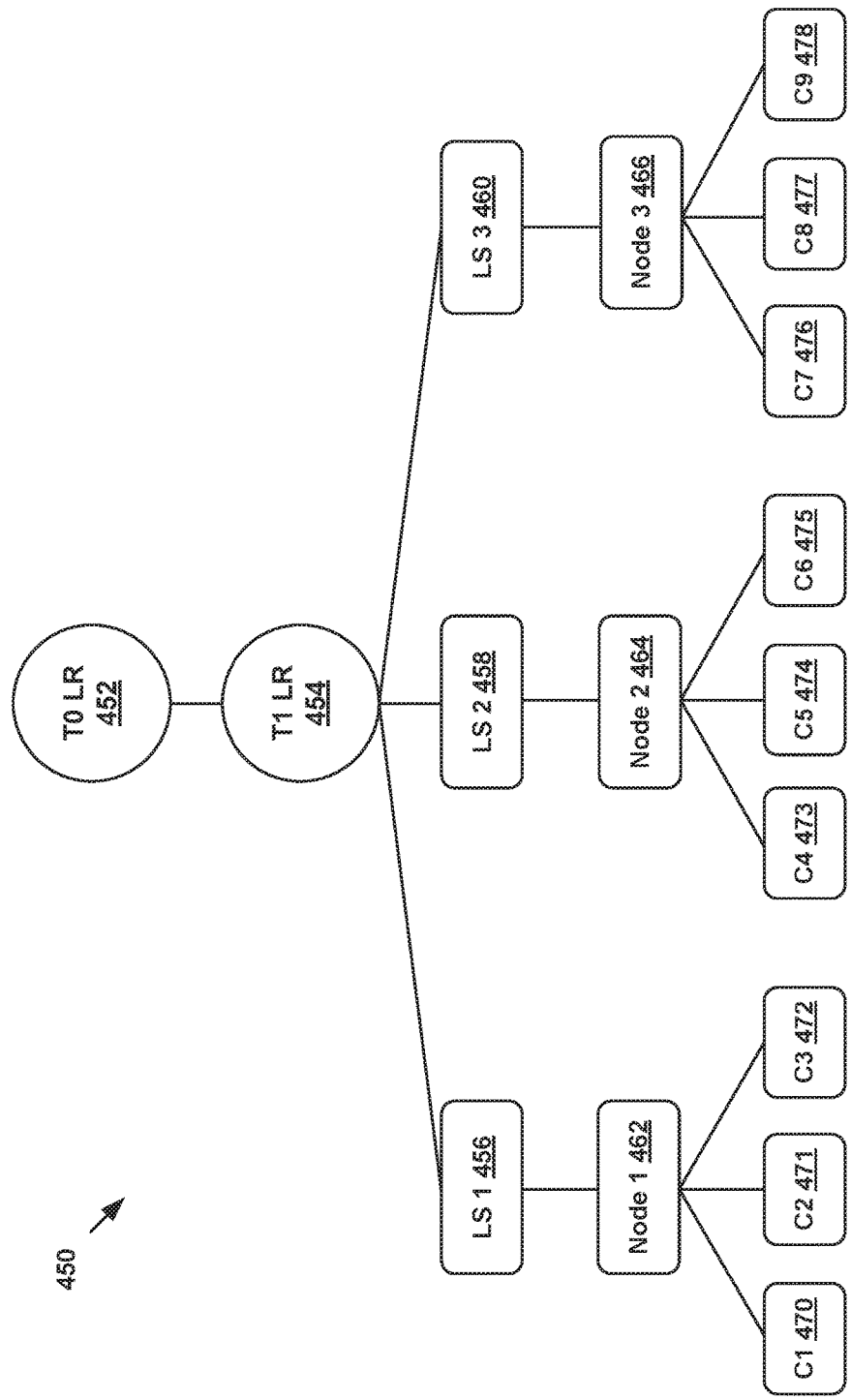

FIGS. 4A and 4B illustrate example topologies according to embodiments described herein. Topology 400 is illustrated in FIG. 4A. In this embodiment, a Tier-1 router 404 uplinks to a Tier-0 router 402. A logical switch 406 is coupled to Tier-1 router 404 and nodes 408, 410, and 412. The nodes can be virtual machines or physical machines, and can comprise container hosts 212 in some embodiments. Each node hosts three containers in this example. Containers 420, 421, and 422 are on node 408; containers 423, 424, and 425 are on node 410; and containers 426, 427, and 428 are on node 412. The nodes in this embodiment share a logical switch 406. Although not illustrated, any number of other topologies may be coupled to one or more other Tier-1 routers that are in turn coupled to Tier-0 router 402.

FIG. 4B illustrates example topology 450. Here, a Tier-1 router 454 uplinks to a Tier-0 router 452. Logical switches 456, 458, and 460 are coupled to Tier-1 router 454. Each logical switch is coupled to a separate node (nodes 462, 464, and 466). Each node also hosts three containers in this example. Containers 470, 471, and 472 are on node 462; containers 473, 474, and 475 are on node 464; and containers 476, 477, and 478 are on node 466. In this embodiment, each node is assigned a separate logical switch.

Figure 5:
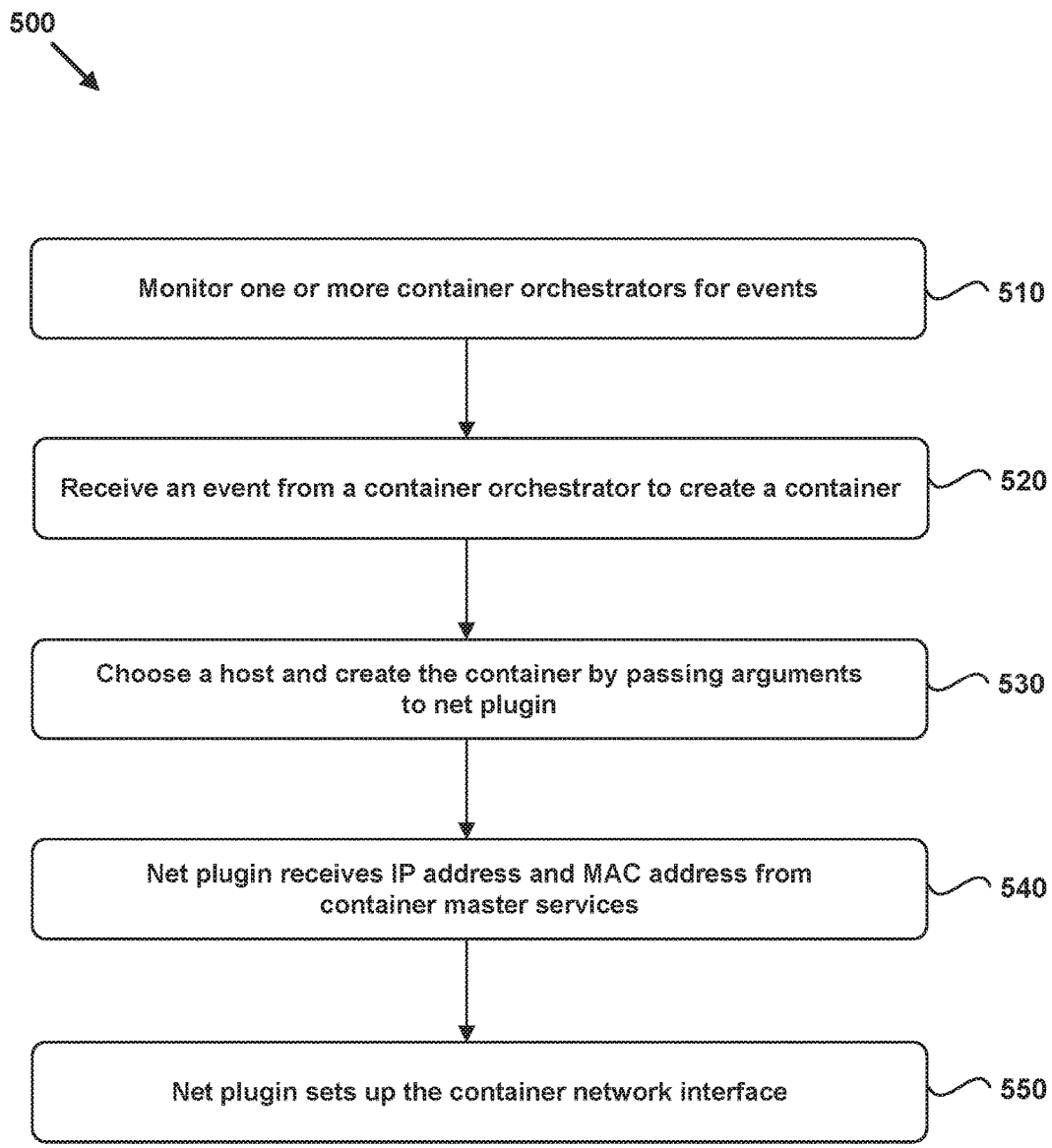
FIG. 5 is a flow diagram of method steps for creating a network topology according to an embodiment

FIG. 5 is a flow diagram of method steps 500 for creating a network topology according to an embodiment. Although the method steps are described in conjunction with FIGS. 1-4B above, persons skilled in the art will understand that any system configured to perform the method steps, in any suitable order, falls within the scope of the present invention. In various embodiments, the hardware and/or software elements described above in FIGS. 1-4B can be configured to perform the method steps of FIG. 5.

Method 500 begins with step 510, where one or more container orchestrators are monitored for events. CM 204 can provide this monitoring in some embodiments. As described above, CM 204 can monitor the container orchestrator(s) via an event stream from the container orchestrator.

At step 520, an event is received from a container orchestrator to create a container. This event may comprise a user request. After this event is received, the method proceeds to step 530. At step 530, a container master services 202 scheduler chooses a host 212 in the SDN network and communicates with container host services 214 to create the container. Container host services 214 then creates the container. Container host services 214 then passes arguments to net plugin 216 by setting up environment variables as described above.

At step 540, net plugin 216 receives the IP address and the MAC address from container master services 202. Net plugin can monitor container master services 202 to receive this information. Net plugin 216 can also receive a VLAN (virtual local area network) ID to associate with the container. The addresses and VLAN ID are provided to container master services 202 by CM 204, which receives them from central controller 206.

Once net plugin 216 receives the needed information, it sets up the container network interface at step 550. Net plugin 216 programs the container with the correct VLAN ID. The container is then set up for connectivity.

Once the application level configuration is translated to a logical network topology via the above embodiments, the logical network can implement multi-tenancy. Multi-tenancy can provide network isolation among namespaces, for example. Each namespace can be mapped to a different topology. Each namespace can therefore have its own Tier-1 router. This mapping provides topology level isolation. Firewall rules in the network virtualization platform are used to isolate the traffic between various topologies. For example, a firewall rule may provide that no two namespaces can communicate with one another. CM 204 may enforce firewall rules in some embodiments and provide network-level isolation.

Namespace isolation can be enforced with firewall rules according to the following example embodiment. An NSGroup is created to identify members of a namespace. For each container logical switch port in the namespace, the port is made a member of the NSGroup. Then a baseline deny-all rule is added. Another rule is added to allow traffic originated from the underlay logical switch. Then a rule is added to allow traffic with a source IP address in the NSGroup. This setup acts to reject connections to pods in the namespace that originated from outside the namespace. It also enables connectivity across the namespace for every port and protocol. This setup also prevents pods in the namespace from opening connections to pods in other namespaces.

When applications and event requests are abstracted to a logical network, many different types of functionality may be added. For example, tenant isolation, traffic management patterns, and quality of service may be provided to the network. Translating from a PAAS/CAAS abstraction to a logical network topology allows this type of functionality to be added. Certain workloads can be given priority over other workloads, as another example.

In sum, embodiments described herein provide a flexible solution to translate an application level configuration to logical network topologies based on rules configured by a user. This solution provides a number of advantages, including multi-tenancy and deployment flexibility.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for translating an application-level abstraction to a logical overlay network topology, comprising:
   receiving an event request regarding a new object from a container orchestrator at an orchestrator adaptor of a container manager;
   defining, by the container manager, a logical overlay network resource based on the event request;
   storing, at the container manager, a mapping associating the new object to the logical overlay network resource; and
   implementing the logical overlay network resource in a logical overlay network to enable connectivity between the new object and the logical overlay network.

2. The method of claim 1, wherein the event request comprises a request to create a container.

3. The method of claim 1, wherein implementing the logical overlay network resource in the logical overlay network further comprises implementing multi-tenancy via a logical overlay network topology.

4. The method of claim 1, wherein the container manager provides an Internet Protocol (IP) address to the container orchestrator in response to the event request.

5. The method of claim 1, wherein the container manager comprises a plurality of unique orchestrator adaptors associated with a plurality of unique container orchestrators.

6. The method of claim 1, wherein the event request comprises a request to create a namespace, and the logical overlay network resource comprises a logical router.

7. The method of claim 1, wherein the event request comprises a request to create a pod, and the logical overlay network resource comprises a logical port.

8. The method of claim 1, wherein the event request comprises a request to create a network policy, and the logical overlay network resource comprises a firewall section.

9. The method of claim 1, wherein the logical overlay network resource comprises one of:
   a logical switch;
   a logical router;
   a logical port;
   a virtualized endpoint;
   a container interface ID; or
   a VLAN ID.

10. The method of claim 1, wherein the orchestrator adaptor comprises one of:
    a Kubernetes® adaptor,
    an OpenShift® adaptor,
    a Docker Swarm® adaptor,
    a Cloud Foundry® adaptor, or
    a Mesos® adaptor.

11. The method of claim 1, wherein the logical overlay network resource is configured to communicate with a virtual network interface associated with the new object.

12. A non-transitory computer-readable storage medium containing a program which, when executed by one or more processors, performs operations for translating an application-level abstraction to a logical overlay network topology, the operations comprising:
    receiving an event request regarding a new object from a container orchestrator at an orchestrator adaptor of a container manager;
    defining, by the container manager, a logical overlay network resource based on the event request;
    storing, at the container manager, a mapping, associating the new object to the logical overlay network resource; and
    implementing the logical overlay network resource in a logical overlay network to enable connectivity between the new object and the logical overlay network.

13. The non-transitory computer-readable storage medium of claim 12, wherein the event request comprises a request to create a container.

14. The non-transitory computer-readable storage medium of claim 12, wherein implementing the logical overlay network resource in the logical overlay network further comprises implementing multi-tenancy via a logical overlay network topology.

15. The non-transitory computer-readable storage medium of claim 12, wherein the container manager comprises a plurality of unique orchestrator adaptors associated with a plurality of unique container orchestrators.

16. The non-transitory computer-readable storage medium of claim 12, wherein the event request comprises a request to create a namespace, and the logical overlay network resource comprises a logical router.

17. The non-transitory computer-readable storage medium of claim 12, wherein the event request comprises a request to create a pod, and the logical overlay network resource comprises a logical port.

18. The non-transitory computer-readable storage medium of claim 12, wherein the event request comprises a request to create a network policy, and the logical overlay network resource comprises a firewall section.

19. A system, comprising:
   a processor; and
   a memory, wherein the memory includes a program executable in the processor to perform operations for translating an application-level abstraction to a logical overlay network topology, the operations comprising:
      receiving an event request regarding a new object from a container orchestrator at an orchestrator adaptor of a container manager;
      defining, by the container manager, a logical overlay network resource based on the event request;
      storing, at the container manager, a mapping associating the new object to the logical overlay network resource; and
      implementing the logical overlay network resource in a logical overlay network to enable connectivity between the new object and the logical overlay network.

20. The system of claim 19, wherein the event request comprises a request to create a container.

21. The system of claim 19, wherein implementing the logical overlay network resource in the logical overlay network further comprises implementing multi-tenancy via a logical overlay network topology.

22. The system of claim 19, wherein the container manager comprises a plurality of unique orchestrator adaptors associated with a plurality of unique container orchestrators.

23. The system of claim 19, wherein the event request comprises a request to create a namespace, and the logical overlay network resource comprises a logical router.

* * * * *